May 25, 1948.  R. E. RUTH ET AL  2,442,149
AUTOMATIC CONTROL SYNCHRONIZER
Filed March 14, 1945  4 Sheets—Sheet 2

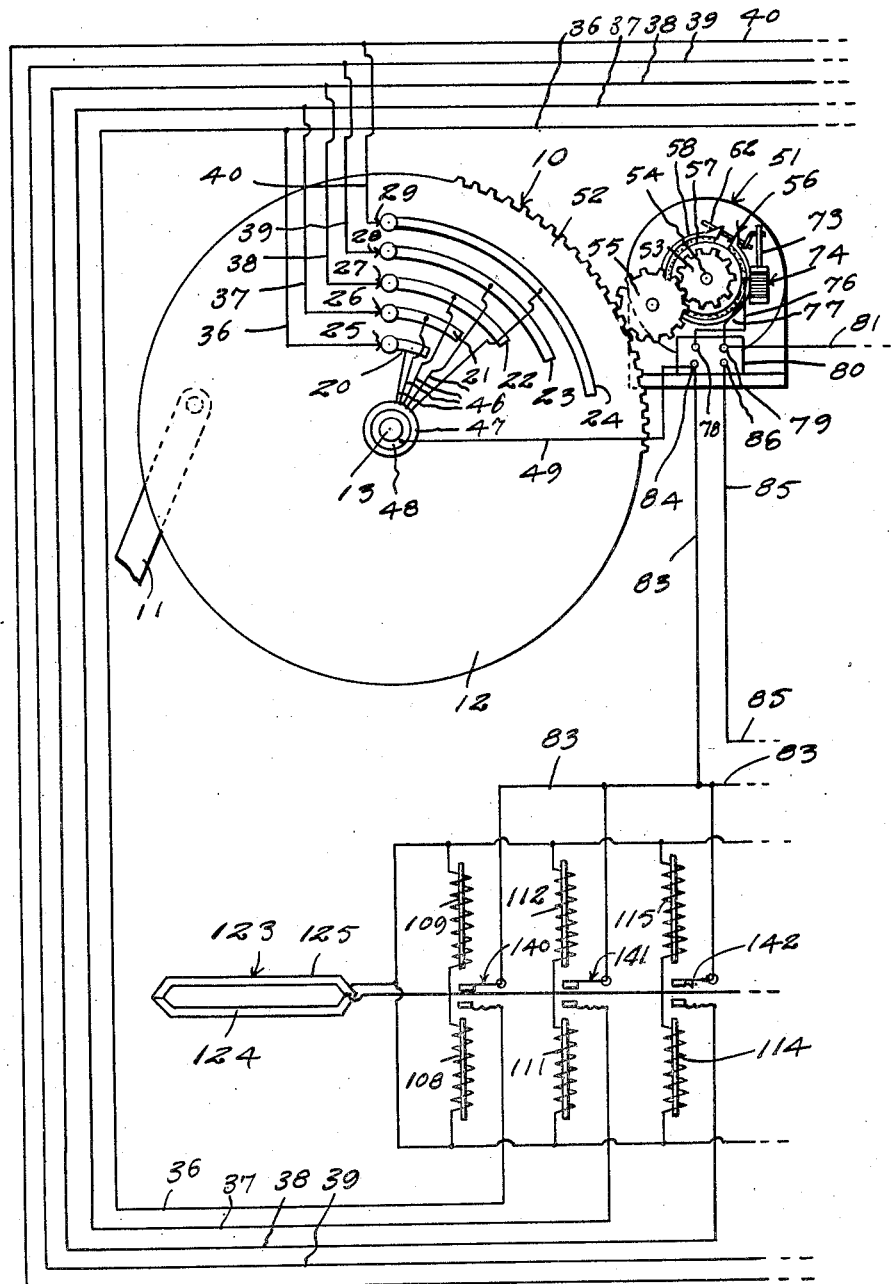

Inventors
R. E. Ruth
R. L. Harvey
By Gandolph & Beavers
Attorneys

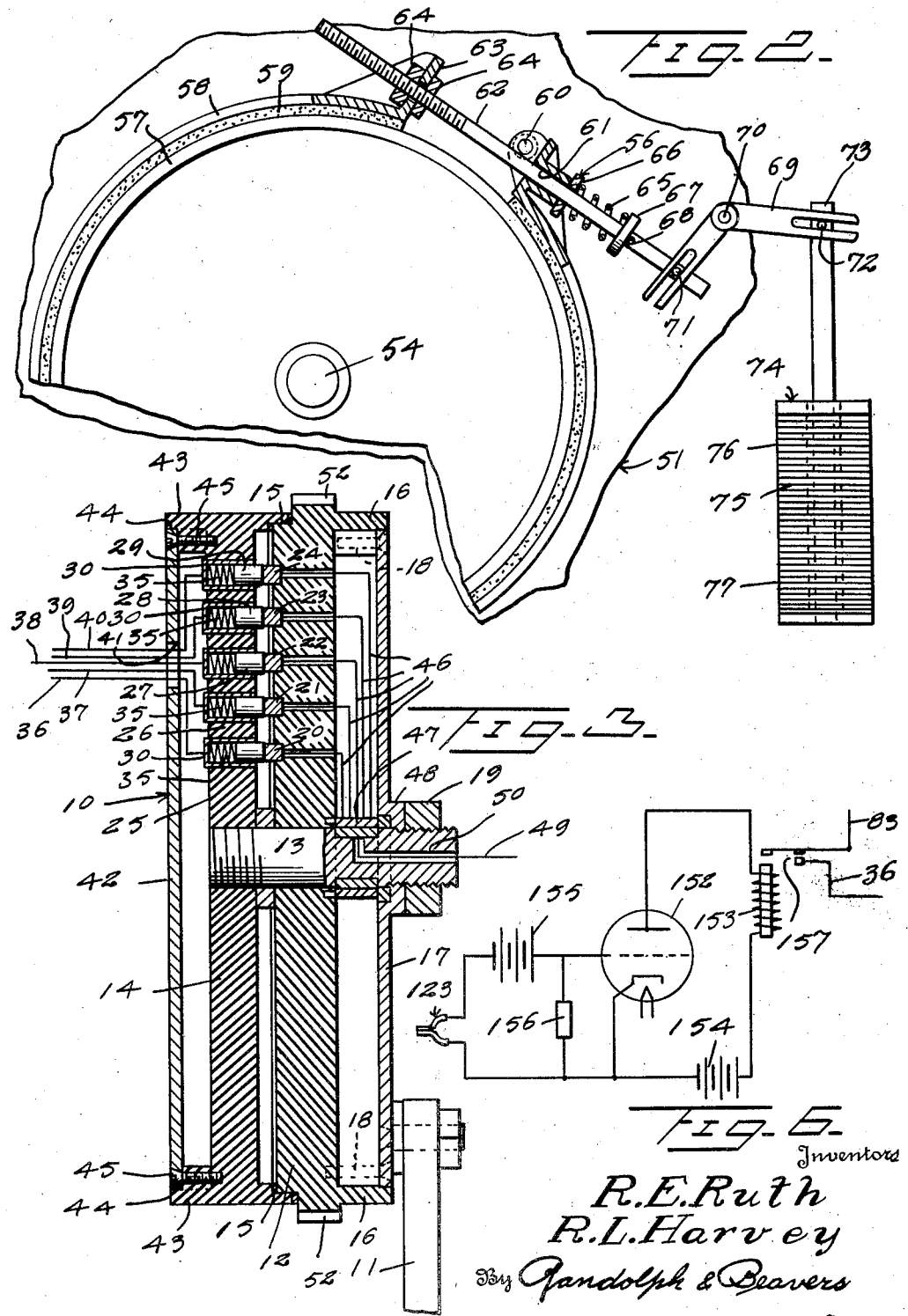

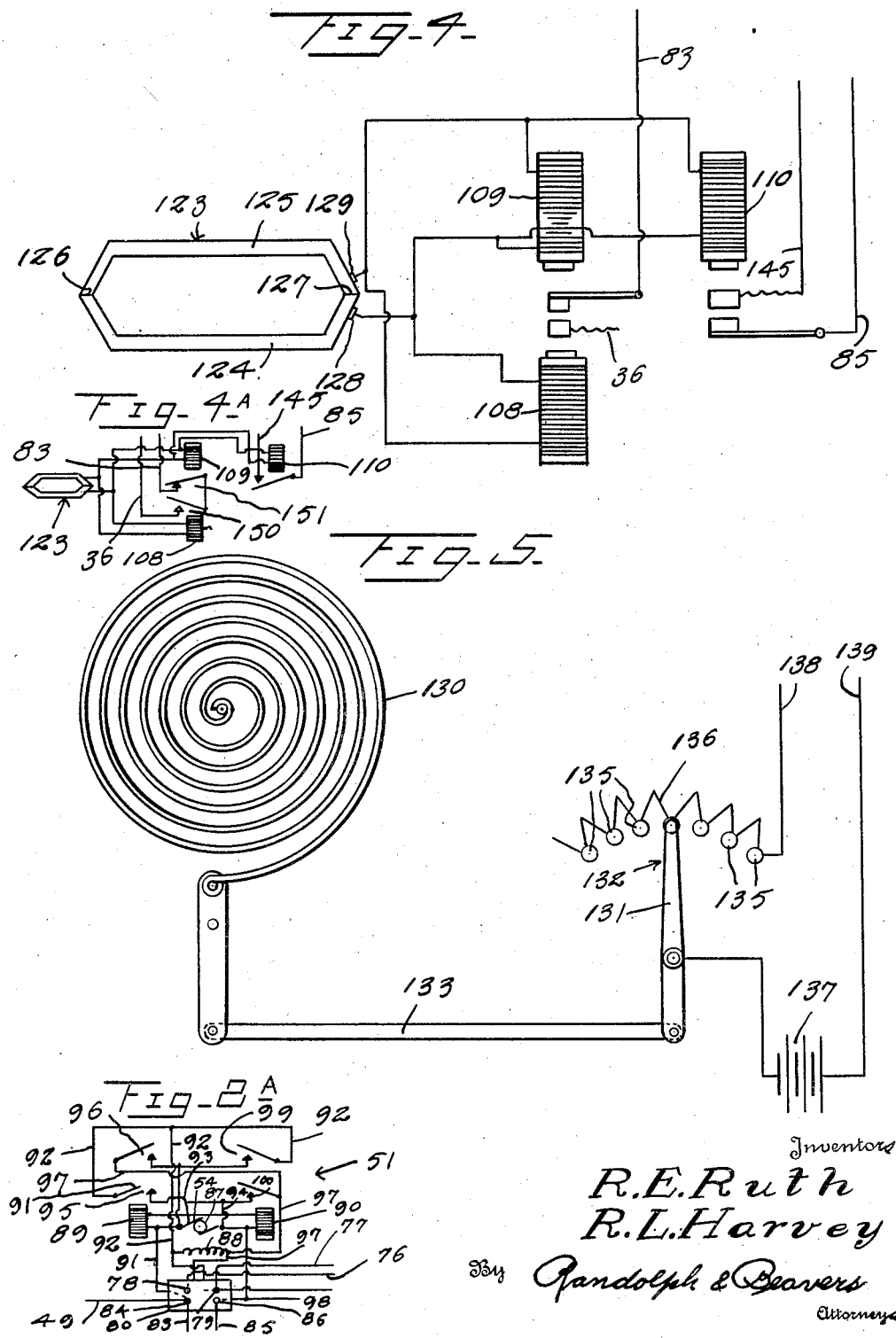

Patented May 25, 1948

2,442,149

UNITED STATES PATENT OFFICE 2,442,149

AUTOMATIC CONTROL SYNCHRONIZER

Raymond E. Ruth and Robert L. Harvey, Odessa, Tex.

Application March 14, 1945, Serial No. 582,698

11 Claims. (Cl. 123—102)

This invention relates generally to automatic control systems in which means responsive to the temperature of a heat source is employed to adjust the temperature thereof to a desired value automatically, the invention being employed to advantage, for example, in connection with the operation of furnaces, ovens, or like heat devices wherein automatic temperature control of the devices is desired.

More specifically, the present invention contemplates the provision of means responsive to the temperature of an internal combustion engine for automatically adjusting the temperature thereof to a value indicative of a desired speed of the engine, it being well known that the speed of an internal combustion engine is proportional to the temperature thereof and that the temperature, therefore, when calibrated, gives a convenient indication of the speed of the engine.

The present invention is particularly well suited for synchronizing the speeds of a plurality of internal combustion engines which are employed to pull the same or different loads at the same speed, and for this purpose a control system of the present invention is employed with each of the engines. The nicety of this arrangement in synchronizing the speeds of two or more engines pulling the same load is readily appreciated for the reason that a direct reading of the R. P. M. of the engines gives no indication that the engines are sharing equally the load carried thereby, as one engine operating at the desired speed may pull substantially the entire load while the other engines merely idle along therewith, thereby overloading said one of the engines, which overloading increases the fuel consumption of the engine and causes premature wearing of the parts thereof. However, the individual temperatures of the several engines indicate the amount of power each engine would deliver to the load and the operating speed thereof if each of the engines were to pull the load alone.

Accordingly, in the preferred arrangement of the present invention, means responsive to the temperature of an internal combustion engine and adapted to generate currents or voltages variably in accordance with the temperature thereof is employed to actuate a plurality of electro-responsive means, in turn, are arranged to cause operation of an electromotive means for adjusting the engine throttle in such a manner as to effect an adjustment thereof adapted to produce an engine temperature corresponding to the desired speed thereof, the foregoing operation being accomplished without need for the usual rods, shafts, turnbuckles, cams, hand wheels and other parts which make up the conventional throttle control units employed on large engine installations, and in the specific manner more clearly to appear hereinafter.

Still other objects, advantages and features of the invention not specifically set forth hereinabove are those which will be specifically described in the following description and those implied from or inherent in the novel combination and arrangement of parts as will become more clearly apparent as the description proceeds, reference being had to the accompanying drawings wherein:

Figures 1 and 1A illustrate diagrammatically a complete electrical system according to a preferred embodiment of the invention;

Figure 2 is an enlarged view, partly broken away, of the motor braking system disclosed in Figure 1;

Figure 2A illustrates a motor control circuit suitable for use with the electrical system of Figures 1 and 1A;

Figure 3 is an enlarged sectional view of the throttle control unit shown in Figure 1;

Figure 4 is a somewhat more detailed view illustrating the structure of the thermocouple and certain of the electromagnets associated therewith in Figure 1;

Figure 4A illustrates an alternate construction for the relays shown in Figure 4;

Figure 5 is a diagrammatic view of an alternate circuit arrangement for energizing the electromagnets shown controlled by the thermocouple in Figures 1 and 1A; and Figure 6 is a diagrammatic view of another alternate circuit arrangement for controlling the energization of the electromagnets shown controlled by the thermocouple in Figures 1 and 1A.

Figure 1A:
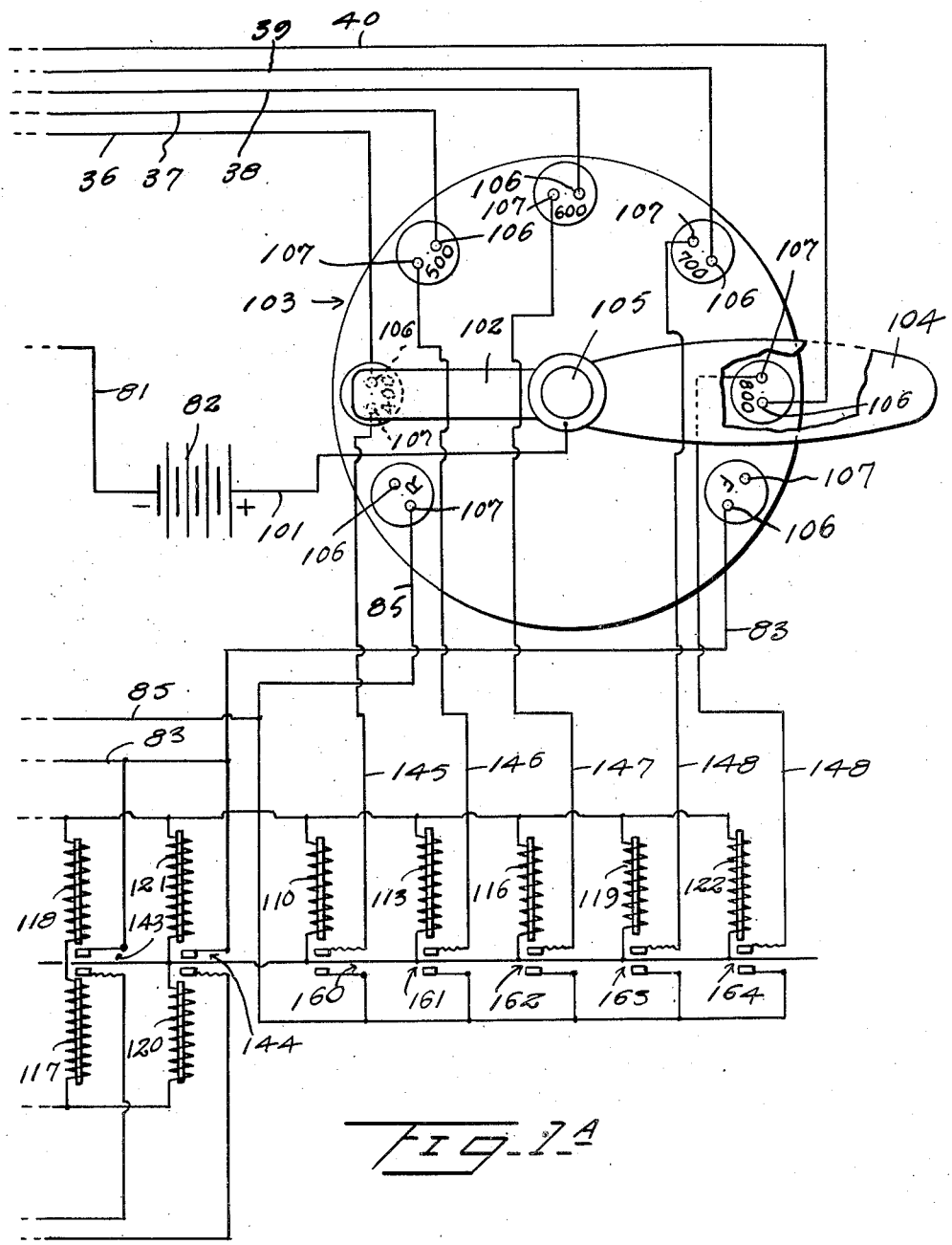

Referring now to the drawings for a more complete understanding of the invention and more particularly to Figures 1 through 4 thereof, the numeral 10 generally designates a throttle control unit having a link or arm 11 which is adapted to be connected to the throttle of an internal combustion engine in a manner to control the flow of fuel thereto in accordance with various adjustments of the arm which, for this purpose, is pivotally connected to a rotatable disc 12. Disc 12 is mounted for rotation about a short shaft 13 which is threadedly secured to a stationary disc 14 with which disc 12 is preferably mountd in registered and slidable engagement at 15. Disc 12 has a flange 16 to which a disc 17 is removably secured in registered engagement therewith as by suitable screws 18, disc 17 being provided with a central opening for permitting extension of shaft 13 therethrough whereby discs 12 and 14 may be secured against axial movement relative to each other as by a nut 19.

Discs 12 and 14 and shaft 13 are composed of any insulation material suitable for the purpose in order that arcuate commutator strips 20 through 24, secured in any conventional manner, to disc 12, and their coacting brushes 25 through 29, disposed radially on disc 14, may be insulated from each other and from their respective discs, each of the brushes being slidably carried in a metal cup 30 and each cup having a spring 35 disposed therein for yieldably urging the brushes into engagement with the commutator strips individual thereto.

Commutator strips 20 through 24 are of progressively greater lengths from the center of disc 12 outwardly and one end of each of the strips lies in a common radius or datum line such that the brushes disengage their commutator strips simultaneously when disc 12 is rotated clockwise from its position as shown in Figure 1 and brushes 25 through 29 disengage their commutator strips progressively or successively in the order named when disc 12 is rotated counter-clockwise from the position shown in Figure 1, the progressive disengagements being spaced according to desired speeds of the engine controlled, as will become more clearly apparent as the description proceeds.

Wires or conductors 36 through 40, connected to brushes 25 through 29, pass through a suitable opening 41 in a cover plate 42 secured to a flange 43 of disc 12 in registered engagement therewith at 44 as by suitable screws 45. Each of commutator strips 20 through 24 is connected as by a suitable conductor 46 to a contact ring 47 carried by disc 12 for rotation therewith. Contact ring 47 slideably engages a similar contact ring 48 secured to shaft 13 whereby the commutator strips are continuously electrically connected to a conductor 49 secured to contact ring 48, a suitable opening 50 being provided in the shaft to permit passage of conductor 49 therethrough.

A reversible direct current motor 51 is employed to impart rotative movement in either direction to disc 12 which, for this purpose, has a gear 52 preferably formed integrally therewith and adapted to be driven by a pinion 53, carried on the motor shaft 54, through a suitable train of gears herein shown to comprise an idler or intermediate gear 55.

An automatic braking system generally designated 56 is employed to releasably lock the motor shaft against rotation while the motor is de-energized, to instantly release the shaft for rotation when the motor is energized, and to instantly lock the shaft against rotation when the motor is de-energized, thereby to prevent overrunning or over-shooting of the motor or slipping of the shaft thereof during deenergization whereby spurious adjustments of the throttle are avoided.

The aforedescribed functions of the braking system are accomplished by means of a brake drum 57 which is secured to the motor shaft 54 for rotation therewith and adapted to be releasably locked against rotation by a brake band 58 having a lining 59 of suitable friction material. The brake band is pivotally secured at one end thereof to the motor case or housing as by a pin 60. This end of the brake band has a radial bore 61 formed therein and adapted slidably to receive a rod 62 having a threaded portion which passes through an opening 63 provided in the free end of brake band 58. Nuts 64 carried by the rod on either side of the free end of the band are employed to adjust variably the compression of a coil spring 65 which is sleeved on rod 62 between a pair of washers 66 and 67 carried thereon and respectively urged by the spring into abutting relation with the fixed end of the brake band and a pin 68 carried by the rod, the nuts being adjusted sufficiently to allow for self-adjustment of the brake band to compensate for wearing of the lining whereby the brake band, under power of the spring, serves to frictionally lock the drum. Means are provided, however, for causing movement of rod 62 in a direction to compress the spring as motor 51 is energized, thereby to release the drum and motor shaft for rotation. This means comprises a bell crank 69 which is pivoted on the motor case by means of a pin 70 and which is provided with slotted arms adapted to receive pins 71 and 72 respectively carried by rod 62 and a plunger 73 of a solenoid 74 having a coil 75 which terminates in leads or conductors 76 and 77. By reason of this linkage between plunger 73 and rod 62, the rod is moved in a direction to separate the ends of brake band 58, thereby to release brake system 56, upon movement of the plunger into coil 75 as the coil is energized.

Leads 76 and 77 of solenoid 74 are connected respectively to terminals 78 and 79 disposed on terminal box or panel 80 of motor 51, terminal 79 also being connected by way of a conductor 81 to the negative side of a suitable battery 82. Conductor 49 from throttle control unit 10 and a conductor 83 are connected to a third terminal 84 and a conductor 85 is connected to a fourth terminal 86 provided on the terminal panel, conductors 49, 83 and 85 being adapted to apply positive potential from battery 82 to the terminals individual thereto whereby motor 51 is operated in reverse directions as terminals 84 and 86 are energized selectively in response to conditions more fully to appear as the description proceeds.

Referring now to Figure 2A it will be seen that motor 51 comprises an armature 87 carried by shaft 54 and a field winding 88 adapted to be reversely connected to the armature and to terminal 79 and terminal 83 or 85 selectively as relays 89 and 90 are energized selectively in accordance with selective application of positive battery potential to either terminal 83 or 85, thereby to reverse the direction of rotation of armature 87 in a well known manner.

The specific manner in which the direction of rotation of motor shaft 54 is accomplished will best be understood by first tracing the circuits which cause the motor shaft to be released for rotation in a counter-clockwise direction and thereafter tracing the circuits which release the shaft and cause it to rotate in a clockwise direction. When positive potential is applied to either conductor 49 or 83, a circuit is completed for operating relay 89 from battery 82 by way of terminal 84, lead or conductor 91, coil of relay 89, and thence by way of conductor 92 through field winding 88 to negative battery potential on terminal 79. As relay 89 operates: a circuit for energizing the armature is completed from positive potential on terminal 84 by way of conductor 91, brush 93, winding of armature 87, brush 94, switch 95 or relay 89, and thence by way of conductor 92 to negative potential on terminal 79, a circuit is completed for energizing the field winding from terminal 84 by way of conductor 91, switch 96 of relay 89, conductor 97, field winding 88, and thence by way of conductor 92 to negative potential on terminal 79, and a circuit is completed for energizing solenoid 74, thereby to release braking system 56, from terminal 84 by way of conductor 91, switch 96 of relay 89, conductor 97 to terminal 78, conductor 76, coil 75 of solenoid 74, and thence by way of conductor 77 to negative potential on terminal 79. When positive potential is applied to conductor 85, a circuit is completed for operating relay 90 from positive potential on terminal 86 by way of conductor 98, winding of relay 90, and thence by way of conductor 92 to negative potential on terminal 79. As relay 90 operates, a circuit for energizing the armature 87, brush 93, conductor 94, switch 99 of relay 90, and thence by way of conductor 92 to negative potential on terminal 79, a circuit is completed for energizing field winding 88 from positive potential on terminal 86 by way of conductor 98, switch 100 of relay 90, conductor 97, field winding 88, and thence by way of conductor 92 to negative potential on terminal 79; and a circuit is completed for energizing solenoid 74 by way of terminal 86, conductor 98, switch 100 of relay 90, conductor 97, terminal 78, conductor 76, coil 75 of solenoid 74, and thence by way of conductor 77 to negative potential on terminal 79. From the foregoing, it should now be apparent that current from battery 82 is caused to flow in the same direction through field winding 88 and solenoid winding 75 and in opposite directions through the armature when terminals 84 and 86, and therefore relays 89 and 90, are energized selectively, thus satisfying the conditions necessary to a release of the armature shaft and rotation thereof in either direction.

Positive potential from battery 82 is applied by way of a conductor 101 to the manually settable switch blade 102 of a speed control box 103 for the internal combustion engine to be controlled, the switch blade having a handle portion 104 whereby the switch blade may be rotated manually about a shaft 105 into engagement with contacts 106 and 107 of any one of a plurality of speed positions designated 400 through 800 R. P. M. and forward F and reverse R.

Conductor 83 from terminal 84 of motor 51 is connected to contact 106 of position F on control box 103 whereby positive potential on battery 82 is applied to conductor 83 by way of conductor 101, switch blade 102, and thence by way of contact 106 of position F when the switch blade is set into engagement therewith, thus causing the motor shaft to rotate in a forward or counter-clockwise direction. Similarly, conductor 85 from terminal 86 of motor 51 is connected to contact 107 of position R on control box 103 whereby positive potential from battery 82 is applied to terminal 86 and the motor shaft is caused to rotate in a reverse or clockwise direction when the switch blade or wiper 102 is set on position R.

Contacts 106 of positions 400 through 800 on control box 103 are connected to conductors 36 through 40 whereby positive potential from battery 82 is applied to conductor 49 and motor shaft 54 is caused to rotate in a counter-clockwise direction when switch blade 102 is set on any one of these positions and as long as the one of the brushes 25 through 29 of throttle control 10 corresponding to the selected one of positions 400 through 800 is in engagement with its associated commutator strips.

Motor shaft 54, and therefore the throttle of the engine under control, is adapted to be adjusted automatically with respect to the adjustment thereof provided by setting of the switch blade with respect to the speed positions of manual control box 103, the automatic adjustments being in accordance with the temperature of the engine. Application of positive potential on terminals 84 and 86, for this purpose, is controlled by electro-magnets or relays 108 through 122 which are adapted to be operated successively or progressively as the temperature of the engine increases progressively to predetermined values corresponding to speeds 400 through 800 as provided by the positions of control box 103, the relays being energized by means responsive to the temperature of the engine and adapted to generate, or cause to be generated, electro-motive forces variably in accordance with the temperature thereof. Any temperature responsive means suitable for the purpose such, for example, as a thermocouple generally designated 123 may be employed, the thermocouple comprising two strips of dissimilar metals 124 and 125 which are joined together at 126 to form a "hot" junction adapted to be disposed in heat transfer relation with respect to a convenient position on the engine such, for example, as within the exhaust manifold or pipe. Strips 124 and 125 are further joined as at 127 to form a "cold" junction having terminals 128 and 129 respectively associated with strips 124 and 125 and adapted to generate E. M. F.'s (electromotive forces) variably in accordance with the differences in temperature of the "hot" and "cold" junctions, as is well known in the art. Relays 108 through 122 are electrically connected in parallel to terminals 128 and 129 of the thermocouple and, accordingly, are adapted to be energized variably as E. M. F.'s are generated by the thermocouple in accordance with variations in the engine temperature.

An alternate arrangement, Figure 5, for the thermocouple may be provided in the form of a bimetallic strip 130 or other heat motor such, for example, as an expansible bellows having a volatile fluid adapted to vary in volume in accordance with variations in temperature, the bimetallic element or other heat motor, as the case may be, being adapted to drive variably the wiper 131 of a rheostat 132 through a connecting link 133 in accordance with the temperature of the heat source with which the bimetallic element or heat motor is associated. Wiper 131 is arranged to engage selectively a plurality of contacts 135 disposed on the resistance coil 136 of rheostat 132 whereby selected portions of the coil may be connected in series through an obvious circuit with a battery 137 by way of wiper 131, and E. M. F.'s of varying values caused to appear between terminals or leads 138 and 139 in accordance with the movement of the heat motor in response to temperature variations sensed thereby, relays 108 through 122 being connected in parallel to leads 138 and 139 when this alternate arrangement is employed.

Relays 108 and 109, 111 and 112, 114 and 115, 117 and 118, and 120 and 121 are adapted to control respectively the operation of switches 140 through 144 which comprise fixed contacts connected to conductors 36 through 40 respectively and movable contacts each of which is connected to conductors 83 in connection with terminal 84 on motor 51. Relays 108, 111, 114, 117 and 120 are employed to close switches 140 through 144 respectively whereas relays 109, 112, 115, 118 and 121 are employed thereafter to open the switches individual thereto in a manner hereinafter more clearly to appear.

Relays 110, 113, 116, 119 and 122 control respectively the operation of switches 160 through 164 which comprise fixed contacts connected respectively to conductors 145 through 149 in connection with contacts 107 of positions 400 through 800 on control box 103 and movable contacts each of which is connected to conductor 85 in connection with terminal 86 on motor 51, these relays being adapted to close their associated switches when energized to a predetermined value and adapted to open their switches when the energization thereafter declines from such predetermined value, as will become more clearly apparent from a description of the operation of the invention.

Figure 4A illustrates an alternate circuit arrangement for relays 108 and 109 in which each of these relays controls a separate switch 150 and 151 respectively. In accordance with this arrangement operation of relay 108 closes switch 150 and completes a circuit from conductor 36, through switch 150, and thence through normally closed switch 151 to conductor 83. This circuit is opened, however, as relay 109 operates to open switch 151. Similarly, separate switches may be employed with the other relays adapted to control automatically the application and removal of positive potential on conductor 83.

It may be desirable to provide current of greater magnitude for actuating each of relays 108 through 122. This may be accomplished by interposing between the thermocouple and each of relays 108 through 122, a circuit including a gas thyratron tube 152 of the trigger type as in Figure 6 in which a relay 153, similar to relays 108 through 122, is connected in the plate circuit of the tube in series with a battery 154 and in which the thermocouple operates into the grid circuit of the tube in series opposing with a negative bias battery 155, the grid being coupled to the cathode by a stabilizing circuit element such as a resistor or condenser 156 in the usual manner. According to this arrangement, when the voltage of the thermocouple decreases the negative bias of battery 155 to a predetermined value, the tube is caused to conduct or pass current from the plate to the cathode thereof. As the tube conducts, its resistance drops to a low value and permits a large current to flow from battery 154 through the coil of relay 153 thereby to actuate the relay and close switch 157 controlled thereby. Bias batteries of various values may be selected for use with the several relays 108 through 122 whereby thermocouple voltages of various magnitudes may be required in the tube circuits individual thereto in order to trigger the tubes respectively associated with the several relays.

The various elements of the speed control system having been described, the operation thereof will now be considered, the operation being best understood by a consideration of specific examples thereof. Let it be assumed that it is desired to operate the internal combustion engine or engines at 600 R. P. M. This is accomplished by first setting each control box 103 in its F or R position, whichever is necessary to cause operation of motor 51 which will set the commutator strips 20 to 24 into engagement with their respective brushes 25 through 29. Each control box is then adjusted to its 600 position which causes motor 51 to operate in a counter-clockwise direction by way of battery 82, conductor 101, switch blade 102, contact 106 of position 600, conductor 38, brush holder 30 and brush 27, commutator strip 22, conductor 46, rings 47 and 48, conductor 49, terminals 84 and 79 of motor 51, and thence by way of conductor 81 to the negative side of battery 82. The motor then continues to operate until the foregoing circuit is opened as commutator strip 22 disengages brush 27. With the engine throttle thus adjusted, the engine is caused to operate at approximately 600 R. P. M. and the temperature thereof rises to a value proportional to the desired speed, as the temperature of the engine increases toward this value, thermocouple 123 develops a progressively increasing E. M. F. (electromotive force) which causes relays 108 through 114 to operate. As relay 114 operates a circuit is completed for driving motor 41 further in a counter-clockwise direction, this circuit being traced by way of positive potential on conductor 38, switch 142, and thence by way of conductor 83 to terminal 84. As the motor operates, the throttle is further adjusted and the speed and temperature of the engine is increased until the E. M. F. at the thermocouple increases sufficiently to cause relay 115 to be actuated whereupon switch 142 is opened and the circuit to motor 51 is interrupted. The engine is now operating at 600 R. P. M. Should the speed, and consequently the temperature corresponding thereto, rise above this value, relay 116 is caused to operate the close switch 162 whereby a circuit for causing motor 51 to operate in a clockwise direction is completed by way of battery 82, conductor 101, switch blade 102, contact 107 of position 600, conductor 147, switch 162, conductor 85, contacts 86 and 79 of motor 51, and thence by way of conductor 81 to the negative side of battery 82. The motor then continues to operate in a clockwise direction until the throttle has been cut down sufficiently to lower the temperature and speed of the engine such that the E. M. F. at the thermocouple becomes insufficient to maintain the operation of relay 116 whereupon switch 162 is opened and operation of the motor 51 ceases and the engine speed is restored to 600 R. P. M. Similarly, in the event that the engine speed becomes less than 600 R. P. M. such that the E. M. F. at the thermocouple is insufficient to maintain the operation of relay 115, switch 142 again closes to apply positive potential on terminal 84 of motor 51, thus causing the motor to operate counter-clockwise and restore the speed of the engine to 600 R. P. M. If it is desired to operate the engine at 800 R. P. M., it merely is necessary to adjust the control box to position 800 whereupon motor 51 operates counter-clockwise until commutator strip 24 disengages brush 29, and as the temperature of the engine rises, relays 16 through 21 operate to set the engine throttle such that the engine speed conforms to 800 R. P. M., the operational procedure being substantially the same as described in connection with operation of the engine at 600 R. P. M.

Now if it is desired to operate the engine at 400 R. P. M., the control box 103 is set in the reverse position R to drive motor 51 clockwise until commutator strip 20 engages its coacting brush 25 and thereafter, the control box is set on position 400 whereupon motor 51 is driven counter-clockwise until commutator strip 20 disengages brush 25. With the throttle thus cut down from its adjustment at 800 R. P. M., the engine temperature decreases until a circuit is again completed to motor 51 by way of position 400, conductor 36, and switch 140, whereupon the motor is further driven counter-clockwise until relay 109 operates to open switch 140, thus providing an adjustment of the engine throttle adapted to maintain the engine speed at 400 R. P. M., deviations from this speed being adjusted through automatic operation of relays 108 or 110, as the case may be, substantially in the same manner as heretofore described in connection with control of the engine at 600 and 800 R. P. M.

From the foregoing it should now be apparent that a speed control system has been provided which is well adapted to fulfill the aforestated objects of the invention. Moreover, it will be apparent that the invention may be employed to advantage in the control of the temperature of various types of heat sources or devices.

While the foregoing specification sets forth the invention in specific terms, it is to be understood that numerous changes in the shape, size and materials may be resorted to without departing from the spirit and scope of the invention as claimed hereinafter.

Having thus described our invention, what we claim as new is:

1. In a speed control system for an internal combustion engine operating under a constant load and having a throttle for controlling the speed thereof, the combinations of manually operative means for selectively setting the throttle into any one of a plurality of positions adapted to produce speeds of the engine which conform approximately to a plurality of desired speeds thereof, means responsive to the temperature of the engine and adapted to produce E. M. F.'s proportional to the temperature thereof, a plurality of electro-responsive devices adapted to be operated successively by said temperature responsive means as the temperature of the engine increases and at temperatures corresponding respectively to said desired speeds of the engine, and means controlled by said electro-responsive devices for causing additional adjustments of the throttle as necessary to bring the speed of the engine into substantial conformance with a desired speed thereof.

2. In a speed control system for an internal combustion engine operating under a constant load and having a throttle for controlling the speed thereof, the combinations of electromotive means for adjusting the throttle, manually operative means for controlling operation of the electromotive means and adapted to cause the electromotive means to set the throttle selectively in a plurality of positions adapted to produce a plurality of desired operating speeds of the engine, means responsive to the temperature of the engine and adapted to produce E. M. F.'s proportional to the temperature thereof, a plurality of electro-responsive devices adapted to be operated successively by said temperature responsive means as the temperature of the engine increases and at temperatures corresponding respectively to said desired speeds of the engines, and means controlled by said electro-responsive devices for causing said electromotive means to operate to produce additional adjustments of the throttle as necessary to bring the speed of the engine into substantial conformance with a desired speed thereof.

3. In a speed control system for an internal combustion engine operating under a constant load and having a throttle for controlling the speed thereof, the combination of electromotive means for adjusting the throttle, means including a source of power for causing the electromotive means to set the throttle selectively in a plurality of positions adapted to produce a plurality of desired operating speeds of the engine, manually operative means settable, selectively into a plurality of positions for initiating said selective operations of the electromotive means, and means controlled by said electro-responsive devices for causing said electromotive means to operate to produce additional adjustments of the throttle as necessary to bring the speed of the engine into substantial conformance with a desired speed thereof.

4. In a speed control system for an internal combustion engine operating under a constant load and having a throttle for controlling the speed thereof, the combination of a thermocouple disposed in heat transfer relation with respect to the engine, first, second and third relays adapted to be operated in succession by the thermocouple as the temperature of the engine rises between predetermined values, a reversible electric motor for adjusting the throttle of the engine, a first circuit adapted to be established as the first relay operates for causing said motor to operate in a direction to adjust the throttle toward a position providing a desired speed of the engine and adapted to be interrupted as the second relay operates, and a second circuit adapted to be established as the third relay operates for causing the motor to operate in the opposite direction to adjust the throttle toward said position providing said desired speed of the engine and adapted to be interrupted as the third relay releases upon a decrease in the engine temperature.

5. In a speed control system for an internal combustion engine operating under a constant load and having a throttle for controlling the speed thereof, the combination of a thermocouple disposed in heat transfer relation with respect to the engine, a plurality of relays adapted to be operated variably by the thermocouple as the E. M. F. generated thereby varies in response to changes in the temperature of the engine, and means controlled by the relays for causing such adjustments of the throttle as necessary to maintain the temperature of the engine substantially at a temperature which conforms to desired speed of the engine.

6. In a speed control system for an internal combustion engine operating under a constant load and having a throttle for controlling the speed thereof, the combination of a reversible electric motor, driving connections between the motor and the throttle whereby the throttle is opened or closed by the motor selectively as it operates in either direction, brush and commutator means associated with said driving connections, a circuit including said brush and commutator means and the motor whereby the motor may be driven to disengage the brush and commutator means and open the circuit at a position of the throttle corresponding approximately to a desired speed of the engine, temperature responsive means disposed in heat transfer relation to the engine and adapted to generate E. M. F.'s proportional to deviations from a predetermined temperature of the engine which corresponds to the desired speed thereof, and means controlled by the temperature responsive means for causing such forward and reverse movements of the motor as necessary to maintain the engine at the desired speed thereof.

7. In a speed control system for an internal combustion engine operating under a constant load and having a throttle for controlling the speed thereof, the combination of a reversible electric motor, driving connections between the motor and the throttle whereby the throttle is opened or closed by the motor selectively as it operates in either direction, brush and commutator means associated with said driving connections, a circuit including said brush and commutator means and the motor whereby the motor may be driven to disengage the brush and commutator means and open the circuit at a position of the throttle corresponding approximately to a desired speed of the engine, temperature responsive means disposed in heat transfer relation to the engine and adapted to generate E. M. F.'s proportional to deviations from a predetermined temperature of the engine which corresponds to the desired speed thereof, a first relay adapted to be operated by said temperature responsive means when the E. M. F. generated thereby is less than that corresponding to said predetermined temperature, a second circuit including said motor and adapted to be closed as the first relay operates to drive the motor in a direction to open the throttle, a second relay adapted to be operated by said temperature responsive means when the E. M. F. generated thereby corresponds to said predetermined temperature and adapted to open said second circuit as the second relay operates, a third relay adapted to be operated by said temperature responsive means when the E. M. F. generated thereby is greater than that corresponding to said predetermined temperature, and a third circuit including said motor and adapted to close as the third relay operates to drive the motor in a direction to close the throttle, said third relay being released to open said third circuit as the temperature of the engine decreases to said predetermined value.

8. In a speed control system for an internal combustion engine operating under a constant load and having a throttle for controlling the speed thereof, the combination of a reversible electric motor, driving connections between the motor and the throttle whereby the throttle is opened or closed by the motor selectively as it operates in either direction, a plurality of commutators of varying lengths carried by the driving connections, a plurality of coacting brushes for the commutators respectively, manually operative means settable into a plurality of positions for selectively connecting the motor in circuit with each of the commutators and its coacting brush whereby the motor may be driven to open the throttle variably as each circuit is interrupted by disengagement of the brush and commutator individual thereto to a plurality of different positions, corresponding approximately to a plurality of desired speeds of the engine, a pair of switches associated with each of the positions of the manually operative means and adapted to close a circuit to further operate the motor in a direction to open the throttle when one of the pair of switches is closed and adapted to close a circuit to operate the motor in a direction to close the throttle when the other of the pair of switches is closed, and means responsive to deviations in the temperature of the engine from any one of a plurality of predetermined temperatures which correspond to said desired speeds thereof for closing said pairs of switches selectively as the temperature of the engine deviates from a selected predetermined temperature.

9. In a speed control system for an internal combustion engine operating under a constant load and having a throttle for controlling the speed thereof, the combination of a reversible electric motor, driving connections between the motor and the throttle whereby the throttle is opened or closed by the motor selectively as it operates in either direction, a plurality of commutators of varying lengths carried by the driving connections, a plurality of coacting brushes for the commutators respectively, manually operative means settable into a plurality of positions for selectively connecting the motor in circuit with each of the commutators and its coacting brush whereby the motor may be driven to open the throttle variably as each circuit is interrupted by disengagement of the brush and commutator individual thereto to a plurality of different positions, corresponding approximately to a plurality of desired speeds of the engine, a pair of switches associated with each of the positions of the manually operative means and adapted to close a circuit to further operate the motor in a direction to open the throttle when one of the pair of switches is closed and adapted to close a circuit to operate the motor in a direction to close the throttle when the other of the pair of switches is closed, means responsive to the temperature of the engine and adapted to generate a voltage variably in accordance therewith, such a plurality of first, second, and third relays for controlling operation of each pair of said switches, said relays being connected in parallel to said voltage generating means and adapted to be operated successively thereby as the voltage increases, said one of said pair of switches being closed to additionally operate the motor to further open the throttle beyond a selected one of said plurality of approximate adjustments thereof as the first relay operates and said one of said pair of switches being opened as said second relay operates, and said other of said pair of switches being closed to operate the motor in a direction to close the throttle as the third relay operates.

10. In a speed control system for an internal combustion engine operating under a constant load and having a throttle for controlling the speed thereof, the combination of a thermocouple disposed in heat transfer relation with respect to the engine, first, second, and third relays, trigger circuit means including a gas thyratron tube disposed between the thermocouple and each of said relays, each of said trigger circuit means including a voltage source in series opposing with the thermocouple and of such value as to cause the relays to be operated in sequence and at predetermined temperatures as the temperature of the engine increases, said first, second and third relays adapted to be operated in succession by the thermocouple as the temperature of the engine rises between predetermined values, a reversible electric motor for adjusting the throttle of the engine, a first circuit adapted to be established as the first relay operates for causing said motor to operate in a direction to adjust the throttle toward a position providing a desired speed of the engine and adapted to be interrupted as the second relay operates, and a second circuit adapted to be established as the third relay operates for causing the motor to operate in the opposite direction to adjust the throttle toward said position providing said desired speed of the engine and adapted to be interrupted as the third relay releases upon a decrease in the engine temperature.

11. In a speed control system for an internal combustion engine operating under a constant load and having a throttle for controlling the speed thereof, the combination of a reversible electric motor, driving connections between the motor and the throttle whereby the throttle is opened or closed by the motor selectively as it operates in either direction, means for locking the motor against rotation when the motor is deenergized and adapted to instantly release the motor for operation so the motor is energized, brush and commutator means associated with said driving connections, a circuit including said brush and commutator means and the motor whereby the motor may be driven to disengage the brush and commutator means and open the circuit at a position of the throttle corresponding approximately to a desired speed of the engine, temperature responsive means disposed in heat transfer relation to the engine and adapted to generate E. M. F.'s proportional to deviations from a predetermined temperature of the engine which corresponds to the desired speed thereof, and means controlled by the temperature responsive means for causing such forward and reverse movements of the motor as necessary to maintain the engine at the desired speed thereof.

RAYMOND E. RUTH.
ROBERT L. HARVEY.

REFERENCES CITED

The following references are of record in the file of this patent:

UNITED STATES PATENTS

| Number | Name | Date |
|---|---|---|
| 1,838,408 | King et al. | Dec. 29, 1931 |
| 2,272,188 | Danielson | Feb. 10, 1942 |
| 2,275,317 | Ryder | Mar. 3, 1942 |
| 2,314,937 | Hannon | Mar. 30, 1943 |